United States Patent [19]

Uno et al.

[11] 4,067,023
[45] Jan. 3, 1978

[54] SHUTTER SPEED DIGITAL DISPLAY DEVICE FOR CAMERAS

[75] Inventors: Naoyuki Uno, Urawa; Tetsuji Shono, Saitama; Fumio Urano, Omiya; Kunio Mita, Kamifukuoka; Masahiro Kawasaki; Chiharu Mori, both of Tokyo, all of Japan

[73] Assignee: Asahi Kogaku Kogyo Kabushiki Kaisha, Tokyo, Japan

[21] Appl. No.: 624,996

[22] Filed: Oct. 22, 1975

[30] Foreign Application Priority Data

Nov. 5, 1974 Japan ............................ 49-133947[U]

[51] Int. Cl.² .............................................. G03B 17/18
[52] U.S. Cl. .................................. 354/23 D; 354/53; 354/60 L; 354/61
[58] Field of Search ............... 354/23 D, 50, 51, 60 A, 354/53, 60 L, 61

[56] References Cited

U.S. PATENT DOCUMENTS

| 3,727,527 | 4/1973 | Borowski et al. | 354/53 |
| 3,812,503 | 5/1974 | Engelsmann et al. | 354/61 |
| 3,843,265 | 10/1974 | Egli et al. | 354/23 D |
| 3,895,875 | 7/1975 | Kitauva et al. | 354/53 |
| 3,909,137 | 9/1975 | Kisanuki | 354/23 D |
| 3,928,858 | 12/1975 | Sakurada et al. | 354/23 D |
| 3,967,288 | 6/1976 | Yamamoto | 354/60 L |

Primary Examiner—Russell E. Adams
Attorney, Agent, or Firm—Christensen, O'Connor, Garrison & Havelka

[57] ABSTRACT

A shutter speed digital display device for cameras equipped with both automatic and manual shutter speed controls is disclosed. A shutter speed display control circuit generates a first digital signal in accordance with the adjustment of the camera's shutter speed by an automatic shutter speed control circuit. The first digital signal is decoded and used to control a light-transmitting liquid crystal device display. In addition, when the camera is in a manual mode of operation, the first digital signal is compared with a second digital signal related to manually adjusted shutter speed. If the comparisons are equal, a coincidence indicator is energized.

10 Claims, 3 Drawing Figures

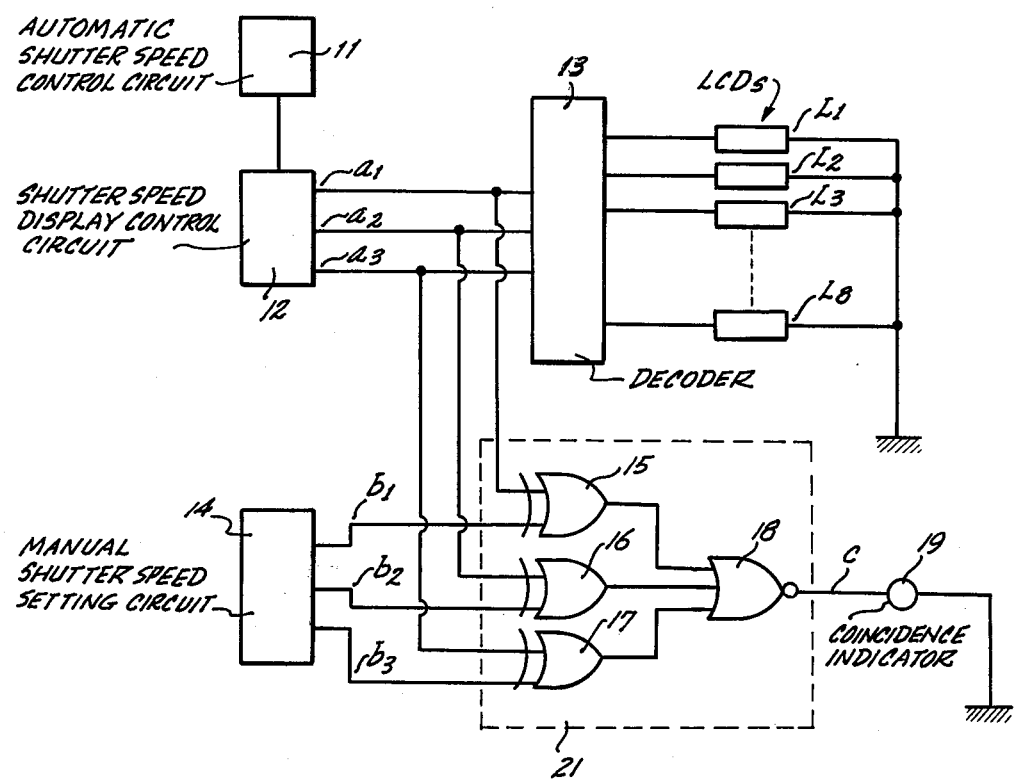

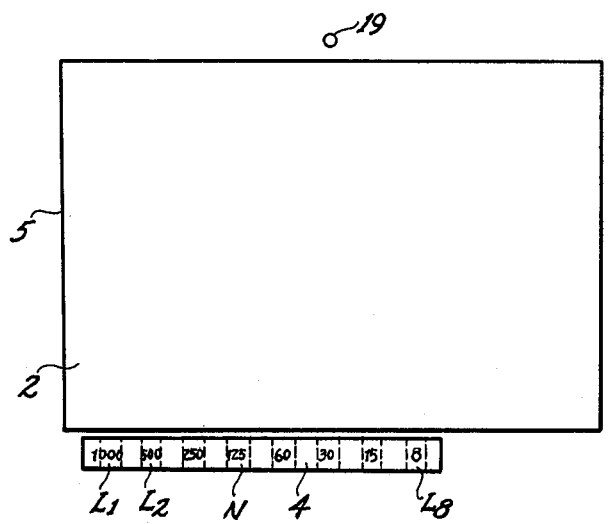
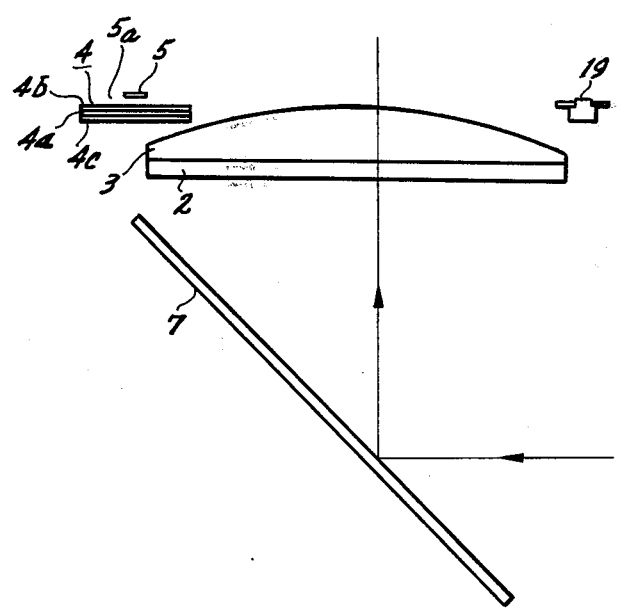

SHUTTER SPEED DIGITAL DISPLAY DEVICE FOR CAMERAS

BACKGROUND OF THE INVENTION

This invention is directed to display devices and, more particularly, to display devices for displaying the shutter speed of a camera.

In a camera equipped with an automatic shutter speed control system, film is exposed automatically at a shutter speed determined by: the sensitivity of the film; a diaphragm value selectively set by the photographer; and, the brightness of the subject to be photographed. Without some form of display, the photographer is unaware of the speed at which the shutter is being operated. To eliminate this drawback, many modern cameras are equipped with a built-in shutter speed display circuit. In some cases, the display is a digital display. The present invention is directed to such digital displays.

It is an object of this invention to provide a digital display device.

It is another object of this invention to provide a new and improved shutter speed digital display device.

It is a further object of this invention to provide a new and improved shutter speed digital display device for use in cameras.

It is yet another object of this invention to provide a new and improved shutter speed digital display device for use in cameras equipped with both automatic and manual shutter controls.

SUMMARY OF THE INVENTION

In accordance with principles of this invention a shutter speed digital display device for use in a camera equipped with both automatic and manual shutter controls is provided. A first digital signal representing the output of the automatic shutter speed control circuit of the camera is decoded and utilized to control the display of a light transmitting liquid crystal display device. In addition, the first digital signal is compared with a second digital signal representing manual shutter speed. The result of the comparison is utilized to control a coincidence indicator.

In accordance with further principles of this invention, both the first and the second digital signals are formed of three parallel binary bits. In addition, comparison is performed by a plurality of exclusive OR gates adapted to compare related significant bits of said first and second parallel binary bits and a NOR gate connected to the outputs of the exclusive OR gates. The output of the NOR gate is connected to the coincidence indicator.

It will be appreciated from the foregoing description that the shutter speed digital display device of the invention is capable of providing a display regardless of whether the related camera is being automatically or manually operated. In the situation where the camera is being manually operated, correct manual adjustment is provided when the coincidence indicator provides an indication of coincidence. When this action occurs, shutter speed has been manually adjusted to the position that the automatic shutter speed control circuit indicates is best for optimum exposure to be achieved.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a block diagram of a shutter speed digital display device formed in accordance with the invention;

FIG. 2 is a plan view illustrating a viewfinder and an adjacent shutter speed digital display; and, FIG. 3 is a side elevational view illustrating the digital display portion of FIG. 2 in combination with a viewfinder optical system.

DESCRIPTION OF THE PREFERRED EMBODIMENT

FIG. 1 illustrates a preferred embodiment of the invention and comprises: an automatic shutter speed control circuit 11; a shutter speed display control circuit 12; a decoder 13; a manual shutter speed setting circuit 14; three two-input exclusive OR gates 15, 16 and 17; a three-input NOR gate 18; a coincidence indicator 19; and, a light transmitting liquid crystal display device comprising a plurality of liquid crystal segments (LCDs) designated L1, L2 . . . L8.

The automatic shutter speed control circuit 11 can take the form of any one of a plurality of presently known circuit arrangements adapted to automatically adjust the shutter speed of a camera. As will be appreciated by those skilled in the art, such devices generate an output signal, usually in analog form, representing the shutter speed automatically adjusted by the automatic shutter speed control circuit in accordance with film sensitivity, set diaphragm value and the brightness of the object. This output is applied to the shutter speed display control circuit 12.

The shutter speed display control circuit converts its input into a first parallel binary coded signal. The illustrated signal is comprised of three binary bits designated $a1$, $a2$ and $a3$, of which $a1$ is the most significant bit, i.e. the bit of the highest order. Thus, if the output of the automatic shutter speed control circuit is in analog form, the shutter speed display control circuit will take the form of an analog-to-digital converter adapted to convert the analog signal into a digital signal. The binary output of the shutter speed display control circuit 12 is applied to the input of the decoder 13.

In accordance with the information contained in the binary bits, the decoder selects one-of-eight outputs and applies a signal thereto. The eight outputs of the decoder are each applied through one of the LCD segments, L1, L2, . . . L8 (which will be more fully described hereinafter) to ground Thus, one of the LCD segments is energized in accordance with the particular value of the binary coded signal composed of bits $a1$, $a2$ and $a3$. In this manner, an automatic indication of the shutter speed set by the automatic shutter speed control circuit is provided by the invention.

Turning now to a discussion of the manual system of operation, when the photographer manually sets the shutter speed of the camera (which action overrides the automatic adjustment of shutter speed), the manual shutter speed setting circuit 14 generates a second digital signal. More specifically, the manual shutter speed setting circuit 14 senses the manual shutter speed adjustment made by the operator of the camera. In accordance with this adjustment, a second parallel binary coded signal formed of three binary bits designated $b1$, $b2$ and $b3$, whose value is related to the manually adjusted setting, are produced. As with bits $a1$, $a2$ and $a3$, bit $b1$ is the most significant bit and compares with bit $a1$. Bit $b2$ compares with bit $a2$ and bit $b3$ compares with bit $a3$.

Bits $a1$, $a2$ and $a3$ are compared with bits $b1$, $b2$ and $b3$ in a comparator formed by the three exclusive OR gates 15, 16 and 17 and the NOR gate 18. More specifically, bits $a1$ and $a2$ are applied to the two inputs of the first exclusive OR gate 15; bits $b2$ and $a2$ are applied to the two inputs of the second exclusive OR gate 16; and, bits $a3$ and $b3$ are applied to the two inputs of the third exclusive OR gate 17. The outputs of the first, second and third exclusive OR gates are applied to the three inputs of the NOR gate 18. As will be appreciated by those skilled in the art, these gates form a comparator that compares bits $a1$, $a2$ and $a3$ with bits $b1$, $b2$ and $b3$. The output of the NOR gate 18 designated as a signal C is applied through the coincidence indicator 19 to ground.

In operation, the shutter speed display control circuit controls the binary states of bits $a1$, $a2$ and $a3$ in accordance with the automatic shutter speed control circuit output, which output is determined by film speed, aperture setting and brightness of the object to be photographed as noted above. When the automatic shutter speed control circuit is to be overridden, the operator adjusts the manual shutter speed setting circuit. In accordance with this adjustment, bits $b1$, $b2$ and $b3$ achieve particular binary states. When bits $a1$, $a2$ and $a3$ compare with bits $b1$, $b2$ and $b3$, i.e. there is coincidence therebetween, the outputs of all three of the exclusive OR gates achieve binary zero states. In accordance with this information, the NOR gate 18 generates a binary one, which one energizes the coincidence indicator 19 to indicate that coincidence exists.

Regardless of manual shutter speed setting, the LCD segments L1, L2 ... L8 always provide an indication of the output of the automatic shutter speed control circuit 11 as converted by the shutter speed display control circuit 15 and decoded by the decoder 13.

An example of the corresponding control relationship between the value of bits $a1$, $a2$ and $a3$ and the LCD segments L1, L2 ... L8, by bit value, is set forth in the following table:

TABLE I

| a1 | a2 | a3 | Display segment | Automatically controlled shutter speed display |
|----|----|----|-----------------|------------------------------------------------|
| 0  | 0  | 0  | L1              | 1000                                           |
| 0  | 0  | 1  | L2              | 500                                            |
| 0  | 1  | 0  | L3              | 250                                            |
| 0  | 1  | 1  | L4              | 125                                            |
| 1  | 0  | 0  | L5              | 60                                             |
| 1  | 0  | 1  | L6              | 30                                             |
| 1  | 1  | 0  | L7              | 15                                             |
| 1  | 1  | 1  | L8              | 8                                              |

It will be appreciated from the foregoing table that the binary coded signal combination formed by bits $a1$, $a2$ and $a3$ control the display segments L1, L2, ..., L8 so as to display 1/1000, 1/500, ..., ⅛ sec, respectively. According to this example, in order to obtain coincidence in the manner described above, the combination of bits $b1$, $b2$ and $b3$ must equal the values set forth in the following table:

TABLE II

| Manually set shutter speed | b1 | b2 | b3 |
|----------------------------|----|----|----|
| 1000                       | 0  | 0  | 0  |
| 500                        | 0  | 0  | 1  |
| 250                        | 0  | 1  | 0  |
| 125                        | 0  | 1  | 1  |
| 60                         | 1  | 0  | 0  |
| 30                         | 1  | 0  | 1  |
| 15                         | 1  | 1  | 0  |
| 8                          | 1  | 1  | 1  |

It will appreciated that binary bits $b1$, $b2$ and $b3$ correspond respectively to the shutter speeds that are set by the photographer operating the manual shutter control mechanism. For these bit values, the output, C, of the NOR gate 18 is given by the following formula:

$$C = \overline{(a1 \cdot \bar{b1} + \bar{a1} \cdot b1) + (a2 \cdot \bar{b2} + \bar{a2} \cdot b2) + (a3 \cdot \bar{b3} + \bar{a3} \cdot b3)}$$

$$= \overline{(a1 \cdot \bar{b1} + \bar{a1} \cdot b1)} \cdot \overline{(a2 \cdot \bar{b2} + \bar{a2} \cdot b2)} \cdot \overline{(a3 \cdot \bar{b3} + \bar{a3} \cdot b3)}$$

It will be appreciated from the foregoing formula that the input conditions for attaining C = 1 are $a1 = b1$, $a2 = b2$ and $a3 = b3$. Thus, output C of the NOR gate 18 becomes a binary one when the output bits of the shutter speed display control circuit 12 coincide with the output bits of the manual shutter speed setting circuit 14. As noted above when such coincidence occurs, the coincidence indicator 19 is lit.

FIGS. 2 and 3 illustrated an arrangement for mounting a shutter speed digital display device formed in accordance with the invention in a camera. FIG. 2 is a plan view of the viewfinder field of a single lens reflex camera that includes a shutter speed digital display device located adjacent the region where the object is viewed by the photographer. FIG. 3 is a side elevational view illustrating, in somewhat more detail, appropriate portions of the camera and the shutter speed digital display device of the invention.

More specifically, FIG. 3 illustrates a reflecting mirror 1 mounted so as to reflect the image viewed by the photographing lens (not shown) such that it images on a focusing plate 2. In the illustrated view, the focusing lens is disposed above the reflecting mirror 1. Disposed on the focusing plate 2, on the side thereof remote from the reflecting mirror 1, is a condensing lens 3. Mounted adjacent the condensing lens 3 so as to receive a portion of the light transmitted by the condensing lens 3 is a light transmitting liquid crystal display device 4. The light transmitting liquid crystal display device 4 forms the LCD segments L1, L2, ... L8 and is composed of a liquid crystal 4a and top and bottom glass plates 4b and 4c sandwiching said liquid crystal 4a therebetween. As best seen in FIG. 2, shutter speed display numerals N are serially marked on top of the top glass plate 4b (e.g. 1,000, 500, 250, ..., 8).

At the plane on which the liquid crystal 4a is in contact with the upper glass plate 4b, display segments L1, L2, L3, ..., L8 are located. They are arranged in the L1, L2, ..., L8 order directly below the numerals to which they correspond, as dictated by Table I above. In addition, a transparent electrode is distributed at the plane where the liquid crystal 4a is in contact with the bottom glass plate 4c. It will be appreciated with this arrangement that, upon development of an output from the decoder circuit 13 (FIG. 1), at which time a voltage is applied to a specific segment, for example segment L2, the electric field developed between the segment and the transparent electrode causes the light transmittance at position L2 to be varied such that the corresponding display numeral (500) is displayed. In this manner, a shutter speed of 1/500 sec. is displayed.

The emitted light comes out of a displaying elongated hole 5a formed on one side of the viewfinder field, which is partitioned with a finder mask 5.

In the case where the shutter speed is adjusted manually, any one of the segments L1, L2, L3, . . . , L8 may be energized to provide a shutter speed display. The actual display will depend upon the adjusted shutter speed value output produced by the automatic shutter speed control circuit 11. At this time, in response to bits $b1$, $b2$ and $b3$, generated by the manual shutter speed setting circuit 14, the exclusive OR circuits 15, 16 and 17 become operative. The outputs of these circuits, as previously described, are transmitted to the NOR gate 18. Further, as previously noted, when the manually set shutter speed correspond to the optimum shutter speed defined by the output of the automatic shutter speed control circuit 11, the conditions of $a1 = b1$, $a2 = b2$ and $a3 = b3$ are satisfied. When this condition is satisfied, the coincidence indicator 19 is ignited or made to glow to indicate to the photographer that an optimum exposure adjustment has been achieved; that is, an optimum exposure condition in accordance with the setting and film speed has been achieved.

It will be appreciated from the foregoing description that, according to the present invention, the LCD segments L1, L2, L3, . . . , L8 may be minimized in number as desired. In other words, the segment whose number is almost equal to the number of the shutter speed graduation may be ignited to provide a display, as opposed to an infinite range of variables being displayed. This arrangement is advantageous in that the construction of a display device can be simplified. Moreover, the display electrical circuit can be considerably simiplified, when compared to a system wherein a larger number of displays are desired. In addition, the use of a common shutter speed display device during both an automatic shutter speed setting sequence of operation and a manual shutter speed setting sequence of operation is advantageous in that it minimizes the manufacturing processes and components required. In addition, with the arrangement of the invention, the display can be readily viewed in the viewfinder field. Because it can be viewed in the viewfinder field, the photographer can manually adjust the camera without removing his eye from the viewfinder to determine what manual adjustment has been set. If desired, even when shutter speed is set manually, the display device of the invention can be used as a system which is operative in association with a so-called follow-up needle type exposure meter.

While a preferred embodiment of the invention has been illustrated and described, it will be appreciated that various changes can be made therein without departing from the spirit and scope of the invention. For example, other types of omparison circuits can be utilized, if desired. In addition, the coding of binary bits $a1$, $a2$ and $a3$ and $b1$, $b2$ and $b3$ for a particular shutter speed can be varied as described. Hence, the invention can be practiced otherwise than as specifically described herein.

The embodiments of the invention in which an exclusive property or privilege is claimed are defined as follows:

We claim:

1. A shutter speed digital display device for cameras having both automatic and manual shutter speed controls comprising:
   a. digital shutter speed display means for displaying shutter speed comprising:
      1. a display control circuit connected to said automatic shutter speed control of said camera for generating an output representing the shutter speed determined by said automatic shutter speed control of said camera; and,
      2. a liquid crystal display means connected to the output of said display control circuit in a manner such that a particular shutter speed digital display is created when a particular output of said display control circuit occurs;
   b. a manual shutter speed setting circuit for generating an output representing the manual setting of the shutter speed of said camera;
   c. comparator means connected to said display control circuit and to said manual shutter speed setting circuit for comparing a signal related to the digital shutter speed displayed by said liquid crystal display means with the output of said manual shutter speed setting circuit and generating an output related to whether or not there is coincidence between said shutter speed display and said output of said manual shutter speed setting circuit; and,
   d. a coincidence indicator connected to the output of said comparator means for indicating when said comparator means senses coincidence between said shutter speed digital display and the output of said manual shutter speed setting circuit.

2. A shutter speed digital display device for cameras having both automatic and manual shutter speed controls as claimed in claim 1 wherein said liquid crystal display means comprises:
   a decoder connected to said display control circuit for decoding the output of said display control circuit and energizing one of a plurality of outputs in accordance with the output of said display control circuit; and,
   a plurality of digital display segments connected to the outputs of said decoder in a manner such that the related segment is energized when one of the outputs of said decoder is energized.

3. A shutter speed digital display device for cameras having both automatic and manual shutter speed controls as claimed in claim 2 wherein:
   said shutter speed display control circuit generates a first digital signal, said first digital signal representing the shutter speed determined by said automatic shutter speed control;
   said manual shutter speed setting circuit generates a second digital signal, said second signal representing the manual setting of the shutter speed of said camera; and
   said comparator is connected to receive and compare said first and second digital signals.

4. A digital display device for cameras having both automatic and manual shutter speed controls as claimed in claim 3 wherein said first and second digital signals each comprise three parallel binary bits.

5. A shutter speed digital display device for cameras having both automatic and manual shutter speed controls as claimed in claim 4 wherein said comparator comprises:

a first exclusive OR gate connected to receive the highest order bits of said first and second digital signals;

a second exclusive OR gate connected to receive the next lower order bits of said first and second digital signals;

a third exclusive OR gate connected to receive the least significant bits of said first and second digital signals; and, a three input NOR gate having its inputs connected to each of the outputs of said first, second and third exclusive OR gates and its output connected to said coincidence indicator.

6. A shutter speed digital display device for cameras having both automatic and manual shutter speed controls as claimed in claim 5 wherein said decoder is a one-of-eight decoder.

7. A shutter speed digital display device for cameras having both automatic and manual shutter speed controls as claimed in claim 6 wherein said plurality of digital display segments comprise a light-transmitting liquid crystal device including a liquid crystal material sandwiched between a pair of transparent plates with a transparent electrode located along the plane formed by one of said plates and a segmented electrode located along the plane formed by the other of said plates, the segments of said segmented electrode connected to the eight outputs of said one-of-eight decoder on a one-to-one basis.

8. A shutter speed digital display device for cameras having both automatic and manual shutter speed controls as claimed in claim 1 wherein:

said display control circuit generates a first digital signal, said first digital signal representing the shutter speed determined by said automatic shutter speed control;

said manual shutter speed setting circuit generates a second digital signal, said second signal representing the manual setting of the shutter speed of said camera; and said comparator is connected to receive and compare said first and second digital signals.

9. A shutter speed digital display device for cameras having both automatic and manual shutter speed controls as claimed in claim 8 wherein said first and second digital signals each comprise parallel binary bits.

10. A shutter speed digital display device for cameras having both automatic and manual shutter speed controls as claimed in claim 1 wherein said liquid crystal display means comprises a light-transmitting liquid crystal display means comprises a light-transmitting liquid crystal device including a liquid crystal material sandwiched between a pair of transparent plates with a transparent electrode located along the plane formed by one of said plates and a segmented electrode located along the plane formed by the other of said plates, the segments of said segmented electrode connected to the output of said display control circuit.

* * * * *

UNITED STATES PATENT AND TRADEMARK OFFICE
CERTIFICATE OF CORRECTION

PATENT NO. : 4,067,023
DATED : January 3, 1978
INVENTOR(S) : Uno et al

It is certified that error appears in the above-identified patent and that said Letters Patent are hereby corrected as shown below:

Column 3, lines 6 and 7, delete "bit i al" and insert --bit al--.

Column 5, line 59, delete "omparison" and insert --comparison--.

Column 5, line 62, delete "described" and insert --desired--.

Column 5, line 68, delete "We claim:".

Column 8, line 23, delete "liquid" and line 24, delete the entire line.

Signed and Sealed this

Eighteenth Day of April 1978

[SEAL]

Attest:

RUTH C. MASON
Attesting Officer

LUTRELLE F. PARKER
Acting Commissioner of Patents and Trademarks